(12) United States Patent
Bross et al.

(10) Patent No.: US 11,070,839 B2
(45) Date of Patent: Jul. 20, 2021

(54) HYBRID VIDEO CODING

(75) Inventors: Benjamin Bross, Berlin (DE); Thomas Wiegand, Berlin (DE); Heiko Schwarz, Berlin (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 1617 days.

(21) Appl. No.: 13/463,837

(22) Filed: May 4, 2012

(65) Prior Publication Data

US 2012/0250769 A1 Oct. 4, 2012

Related U.S. Application Data

(63) Continuation of application No. PCT/EP2010/066752, filed on Nov. 3, 2010.
(Continued)

(51) Int. Cl.
*H04N 19/61* (2014.01)
*H04N 19/46* (2014.01)
(Continued)

(52) U.S. Cl.
CPC ......... *H04N 19/523* (2014.11); *H04N 19/105* (2014.11); *H04N 19/107* (2014.11); *H04N 19/109* (2014.11); *H04N 19/119* (2014.11); *H04N 19/13* (2014.11); *H04N 19/147* (2014.11); *H04N 19/159* (2014.11); *H04N 19/172* (2014.11); *H04N 19/174* (2014.11);
(Continued)

(58) Field of Classification Search
CPC .... H04N 19/523; H04N 19/196; H04N 19/52; H04N 19/159; H04N 19/176; H04N 19/119; H04N 19/147; H04N 19/172; H04N 19/46; H04N 19/56; H04N 19/13; H04N 19/593; H04N 19/107; H04N 19/109
USPC .................................................. 375/240, 204
See application file for complete search history.

(56) References Cited

U.S. PATENT DOCUMENTS

2005/0249291 A1 11/2005 Gordon et al.
2006/0251330 A1* 11/2006 Toth et al. .................... 382/236
(Continued)

FOREIGN PATENT DOCUMENTS

| JP | 2001-045475 A | 2/2001 |
|----|---------------|--------|
| WO | 2007/011189 A1 | 1/2007 |
| WO | 2009/052697 A1 | 4/2009 |

OTHER PUBLICATIONS

Official Communication issued in corresponding Japanese Patent Application No. 2012-537392, dated Oct. 8, 2013.
(Continued)

*Primary Examiner* — Susan E. Hodges
(74) *Attorney, Agent, or Firm* — Keating & Bennett, LLP

(57) ABSTRACT

A further coding efficiency increase is achieved by, in hybrid video coding, additionally predicting the residual signal of a current frame by motion-compensated prediction using a reference residual signal of a previous frame. In other words, in order to further reduce the energy of the final residual signal, i.e. the one finally transmitted, and thus increase the coding efficiency, it is proposed to additionally predict the residual signal by motion-compensated prediction using the reconstructed residual signals of previously coded frames.

27 Claims, 6 Drawing Sheets

Related U.S. Application Data

(60) Provisional application No. 61/258,770, filed on Nov. 6, 2009.

(51) Int. Cl.
*H04N 19/10* (2014.01)
*H04N 19/50* (2014.01)
*H04N 19/523* (2014.01)
*H04N 19/119* (2014.01)
*H04N 19/537* (2014.01)
*H04N 19/176* (2014.01)
*H04N 19/147* (2014.01)
*H04N 19/463* (2014.01)
*H04N 19/107* (2014.01)
*H04N 19/52* (2014.01)
*H04N 19/174* (2014.01)
*H04N 19/159* (2014.01)
*H04N 19/109* (2014.01)
*H04N 19/196* (2014.01)
*H04N 19/105* (2014.01)
*H04N 19/13* (2014.01)
*H04N 19/19* (2014.01)
*H04N 19/56* (2014.01)
*H04N 19/172* (2014.01)
*H04N 19/593* (2014.01)

(52) U.S. Cl.
CPC ........... *H04N 19/176* (2014.11); *H04N 19/19* (2014.11); *H04N 19/196* (2014.11); *H04N 19/46* (2014.11); *H04N 19/463* (2014.11); *H04N 19/52* (2014.11); *H04N 19/537* (2014.11); *H04N 19/56* (2014.11); *H04N 19/593* (2014.11)

(56) References Cited

U.S. PATENT DOCUMENTS

| | | | |
|---|---|---|---|
| 2007/0223886 A1* | 9/2007 | Bourge | H04N 7/012 386/232 |
| 2008/0037656 A1* | 2/2008 | Hannuksela | 375/240.26 |
| 2008/0165848 A1* | 7/2008 | Ye | H04N 19/105 375/240.13 |
| 2010/0310184 A1 | 12/2010 | Yu et al. | |
| 2011/0002554 A1* | 1/2011 | Uslubas et al. | 382/238 |

OTHER PUBLICATIONS

Official Communication issued in International Patent Application No. PCT/EP2010/066752, dated May 31, 2011.

Chen et al.; "Re-prediction in Inter-prediction of H.264"; ITU—Telecommunications Standardization Sector; Oct. 20, 2007; pp. 1-6; Shenzhen, China.

Chen et al.; "Second Order Prediction (SOP) in P Slice"; ITU—Telecommunications Standardization Sector; Jul. 16-18, 2008; pp. 1-7; Berlin, Germany.

Li et al.; "Second Order Prediction on H.264/AVC"; Picture Coding Symposium, May 6, 2009; 4 pages; Piscataway, NJ.

Zhang et al.; "Video Coding Using Variable Block-Size Spatially Varying Transforms"; IEEE International Conference on Acoustics, Speech, and Signal Processing, Apr. 19, 2009; pp. 905-908; Piscataway, NJ.

Zhang et al.; "Video Coding Using Spatially Varying Transform"; Proceeding of the 3rd Pacific Rim Symposium on Advances in Image and Video Technology, Lecture Notes in Computer Science; vol. 5414; Jan. 13, 2009; pp. 796-806; Berlin, Heidelberg, Germany.

\* cited by examiner

HYBRID VIDEO CODING

CROSS-REFERENCE TO RELATED APPLICATIONS

This application is a continuation of copending International Application No. PCT/EP2010/066752, filed Nov. 3, 2010, which is incorporated herein by reference in its entirety, and additionally claims priority from U.S. Application No. 61/258,770, filed Nov. 6, 2009, which is also incorporated herein by reference in its entirety.

BACKGROUND OF THE INVENTION

(1) Field of the Invention

The present invention relates to the field of digital processing and, in particular, to hybrid video coding.

There is an ongoing need to increase the compression rate of video coding. Although storage and transmission techniques exhibit an increasing data capacity, the demands on media quality and capabilities such as in terms of spatial resolution, number of views, bit depth, etc. increase, too, thereby compensating the technical storage and transmission progress. Accordingly, there is still a need to increase the effectiveness of compression techniques. Hybrid video coding is currently the advantageous tool for video compression. In hybrid video coding, prediction of the video material is performed in order to increase the compression ratio. In particular, instead of coding the video material directly, the prediction residual, i.e. the residual signal is coded. Transform and/or entropy coding may be used, for example, in order to encode the residual signal.

(2) Description of Related Art Including Information Disclosed Under 37 CFR 1.97 and 1.98

In [1], Gisladottir et al. a scheme is presented, in which only motion information is transmitted. No residual signal is sent to the decoder. A so called second order prediction of the residual signal is proposed in [2]. An intra prediction (using reconstructed residual samples inside the same frame) is used to further reduce the energy of the error signal.

BRIEF SUMMARY OF THE INVENTION

An embodiment may have a hybrid video decoder configured to additionally predict a residual signal of a currently decoded frame by motion-compensated prediction using a reference residual signal of a previously decoded frame.

Another embodiment may have a hybrid video encoder configured to additionally predict a residual signal of a currently encoded frame by motion-compensated prediction using a reference residual signal of a previously encoded frame.

According to another embodiment, a hybrid video decoding method may have the step of additionally predicting a residual signal of a currently decoded frame by motion-compensated prediction using a reference residual signal of a previously decoded frame.

According to another embodiment, a hybrid video encoding method may have the step of additionally predicting a residual signal of a currently encoded frame by motion-compensated prediction using a reference residual signal of a previously encoded frame.

According to another embodiment, a hybrid video coded bitstream may have information on residual prediction motion parameters prescribing a motion-compensated prediction of a prediction error of a residual signal of the predetermined frame by motion-compensated prediction using a reference residual signal of a previously coded frame.

Another embodiment may have a computer program having a program code for performing, when running on a computer, an inventive method.

A basic idea underlying the present invention is that a further coding efficiency increase may be achieved if, in hybrid video coding, the residual signal of a current frame is additionally predicted by motion-compensated prediction using a reference residual signal of a previous frame. In other words, in order to further reduce the energy of the final residual signal, i.e. the one finally transmitted, and thus increase the coding efficiency, it is proposed to additionally predict the residual signal by motion-compensated prediction using the reconstructed residual signals of previously coded frames.

BRIEF DESCRIPTION OF THE SEVERAL VIEWS OF THE DRAWING(S)

Embodiments of the present invention will be detailed subsequently referring to the appended drawings, in which.

Figure 4A:
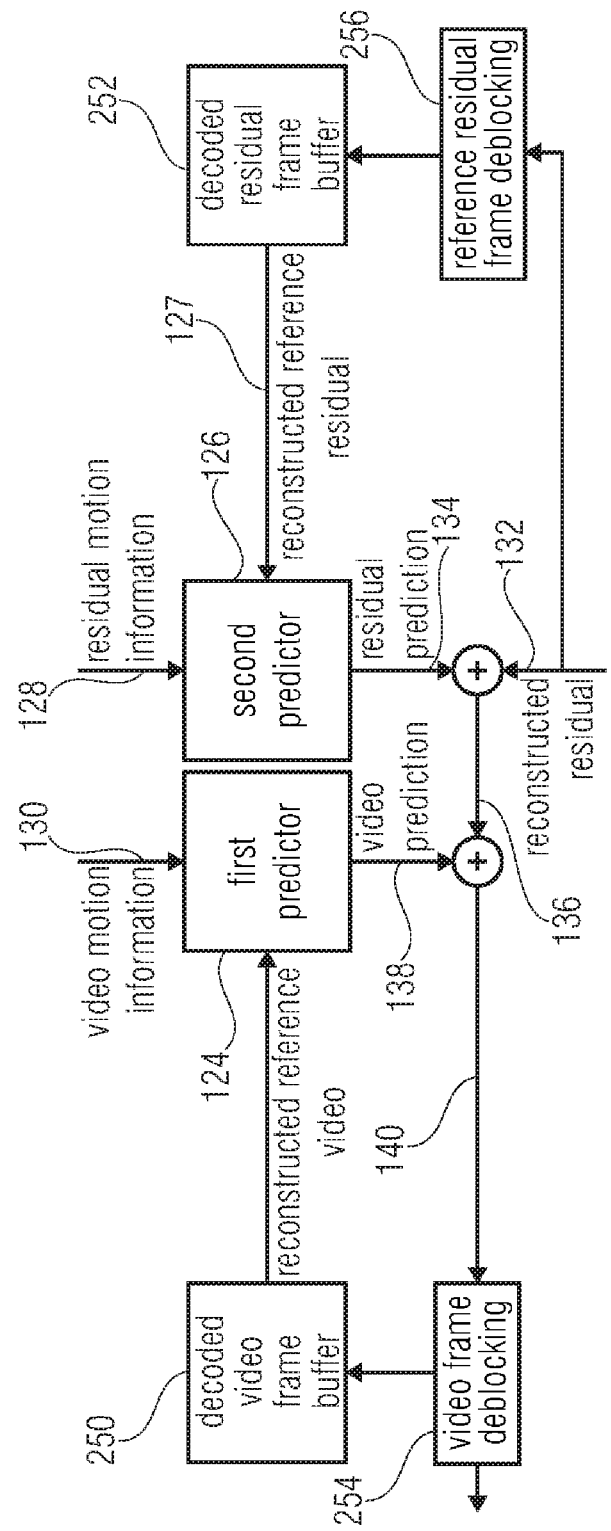
Figure 5:
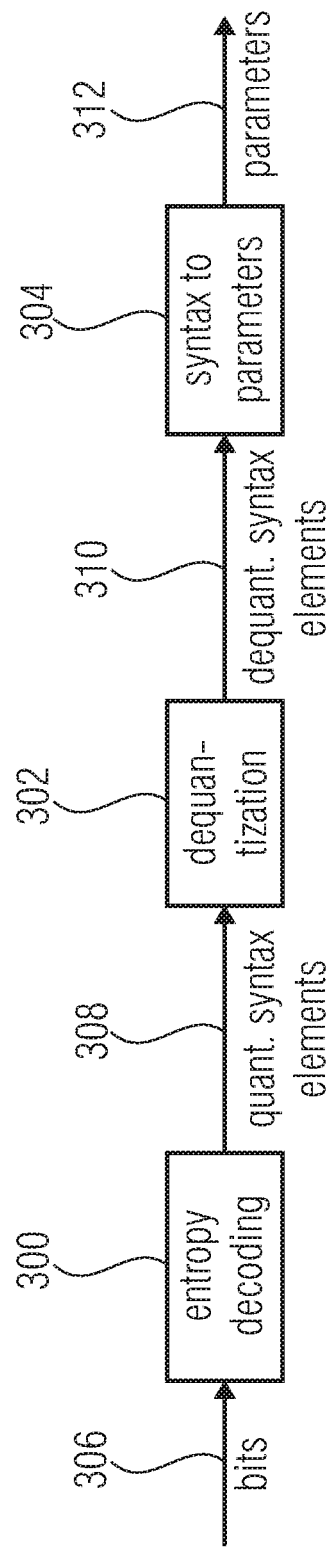

FIG. 4a+b show block diagrams of a predictive part of a video signal reconstruction section of a hybrid video en/decoder according to alternative embodiments; and FIG. 5 shows a block diagram of a parameter reconstruction section of a hybrid video decoder according to an embodiment.

DETAILED DESCRIPTION OF THE INVENTION

Figure 1:
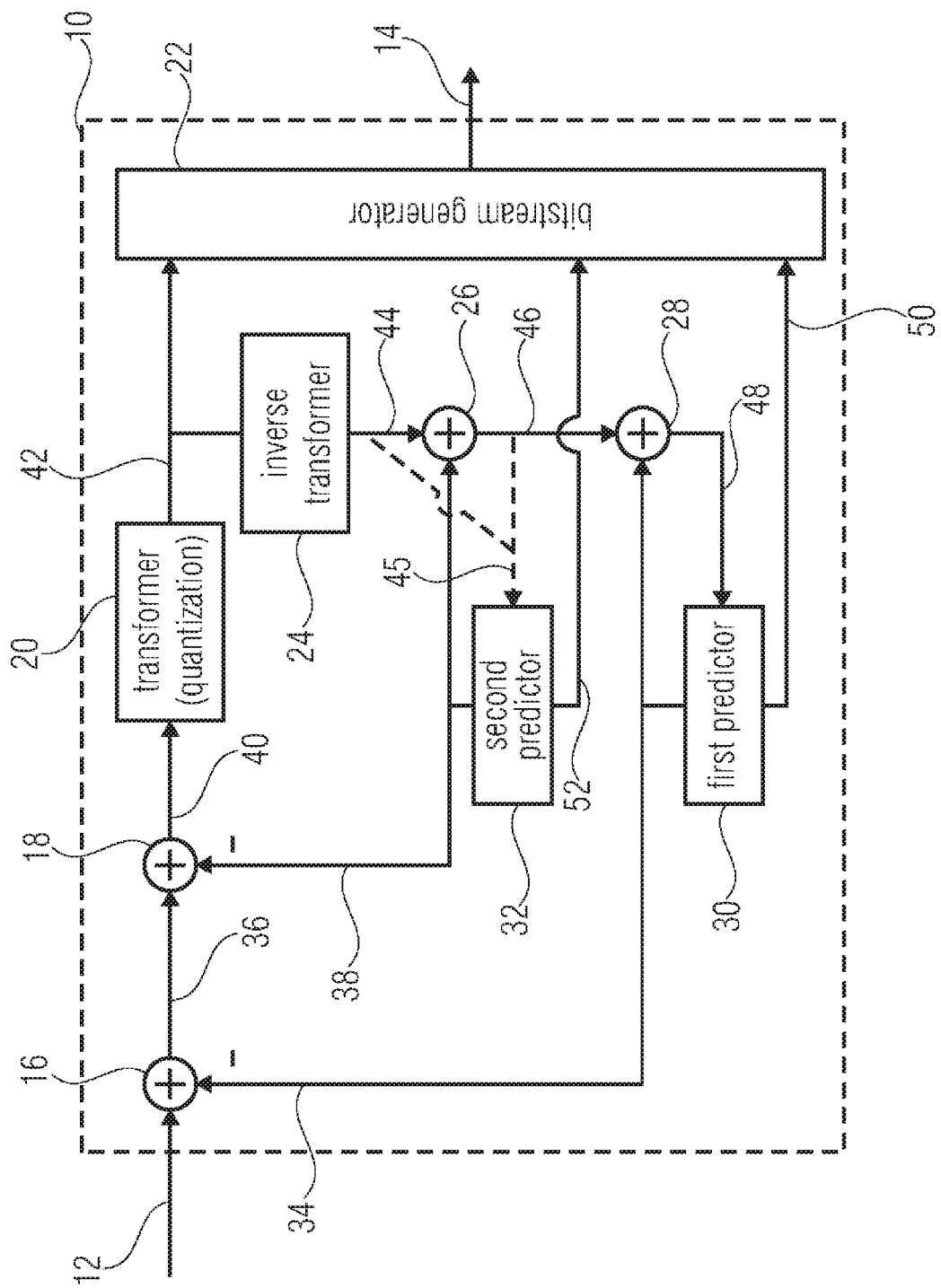
FIG. 1 shows a block diagram of a hybrid video encoder according to an embodiment.

FIG. 1 shows an encoder 10 according to an embodiment of the present invention. The encoder is a hybrid video encoder configured to encode a video 12 into a bitstream 14 by predicting a currently encoded frame of video 12 by use of previously encoded portions of video 12, and instead of directly encoding the residual signal representing the prediction error into bitstream 14, predicting the residual signal of the currently encoded frame by motion-compensated prediction using a reference residual signal of a previously encoded frame.

FIG. 1 shows exemplarily as to how hybrid video encoder 10 may be construed internally. As shown, hybrid video encoder 10 may comprise a first subtractor 16, a second subtractor 18, a transformer 20 and a bitstream generator 22, serially connected between input 12 receiving the video, an output 14 outputting the afore-mentioned bitstream. In particular, subtractors 16 and 18 have their non-inverting input connected to input 12 and the output of subtractor 16, respectively, and transformer 20 is connected between an output of subtractor 18 and the first input of bitstream generator 22 which, in turn, has an output connected to output 14. Hybrid video encoder 10 further comprises an inverse transformer 24, a first adder 26 and a second adder 28 serially connected—in the order mentioned—to the output of transformer 20.

Hybrid video encoder 10 comprises a first predictor 30 which is connected between an output of adder 28 and a second input thereof with a first input of adder 28 being connected to the output adder 26. Similarly, hybrid video encoder 10 comprises a second predictor 32 which is connected between an output of adder 26 and a second input thereof, with the first input of adder 26 being connected to the output of inverse transformer 24. Alternatively, and as illustrated by use of dashed lines in FIG. 1, predictor 32 may alternatively be connected between the first and second input of adder 26. The output of predictor 30 is not only connected to the second input of adder 28, but also to the inverting input of subtractor 16. Similarly, the output of predictor 32 is not only connected to the second input of adder 26, but also to the subtracting input of subtractor 18. Both predictors, 30 and 32, have a further output, a parameter output, connected to two further inputs of bitstream generator 22.

Before discussing an example for an internal structure of a respective hybrid video decoder with, subsequently thereto, discussing the mode of operation of hybrid video encoder and decoder commonly in detail, the operation of hybrid video encoder 10 of FIG. 1 is briefly discussed now. As already noted above, hybrid video encoder 10 not only predicts the frames of video 12 directly, but also predicts the respective residual signals of the frames. Accordingly, predictor 30 predicts the frames of video 12 with the result of the prediction, i.e. the prediction signal before being applied to the inverting input of subtractor 16. Predictor 32 predicts the residual signal 36 obtained by the output of subtractor 16, representing, in turn, a difference between prediction signal 34 and the respective frame. The result of the prediction of predictor 32 may thus be called a residual prediction signal 38 and is applied to the inverting input of subtractor 18 with the result of the subtraction of the output of subtractor 18 representing a final residual signal 40, which is subject to transform coding in transformer 20. That is, transformer 20 may, according to the embodiment of FIG. 1, perform a transformation, such as a DCT or the like, and a subsequent quantization on the final residual signal 40 in order to obtain respective quantized transform coefficients 42. However, the existence of transformer 20 is merely shown for illustrative purposes and its existence is not critical for the present invention. In effect, same may be missing.

The inverse transformer 24 reconstructs the final residual signal based on the output of transformer 20 to obtain a reconstructed final residual signal 44 corresponding to the final residual signal 40 except for the information loss due to the quantization in transformer 20. Addition of final residual signal 44 and residual prediction signal 38 results in a residual signal 46 and addition of residual signal 46 and prediction signal 34 by adder 28 results in a currently decoded or reconstructed frame 48. Based on the respective inbound signal, predictors 30 and 32 perform their prediction as already stated above. Predictor 30, for example, may switch between an intra-prediction mode and a motion-compensated prediction mode. The switching granularity may be in sets of samples of the frames of video 12, such as macroblocks or other blocks as will be described in more detail below. The prediction parameters 50 describing the way predictor 30 obtains prediction signal 34 are passed on by predictor 30 to bitstream generator 22 for being inserted into bitstream 14 such as, for example, within the side information thereof. Predictor 32 uses motion-compensated prediction in order to obtain residual prediction signal 38 and forwards the residual prediction motion parameters 52 describing the way predictor 32 obtains residual prediction signal 38 by way of motion-compensated prediction, to bitstream generator 22 for insertion into bitstream 14 such as, for example, within the side information thereof.

Figure 2:
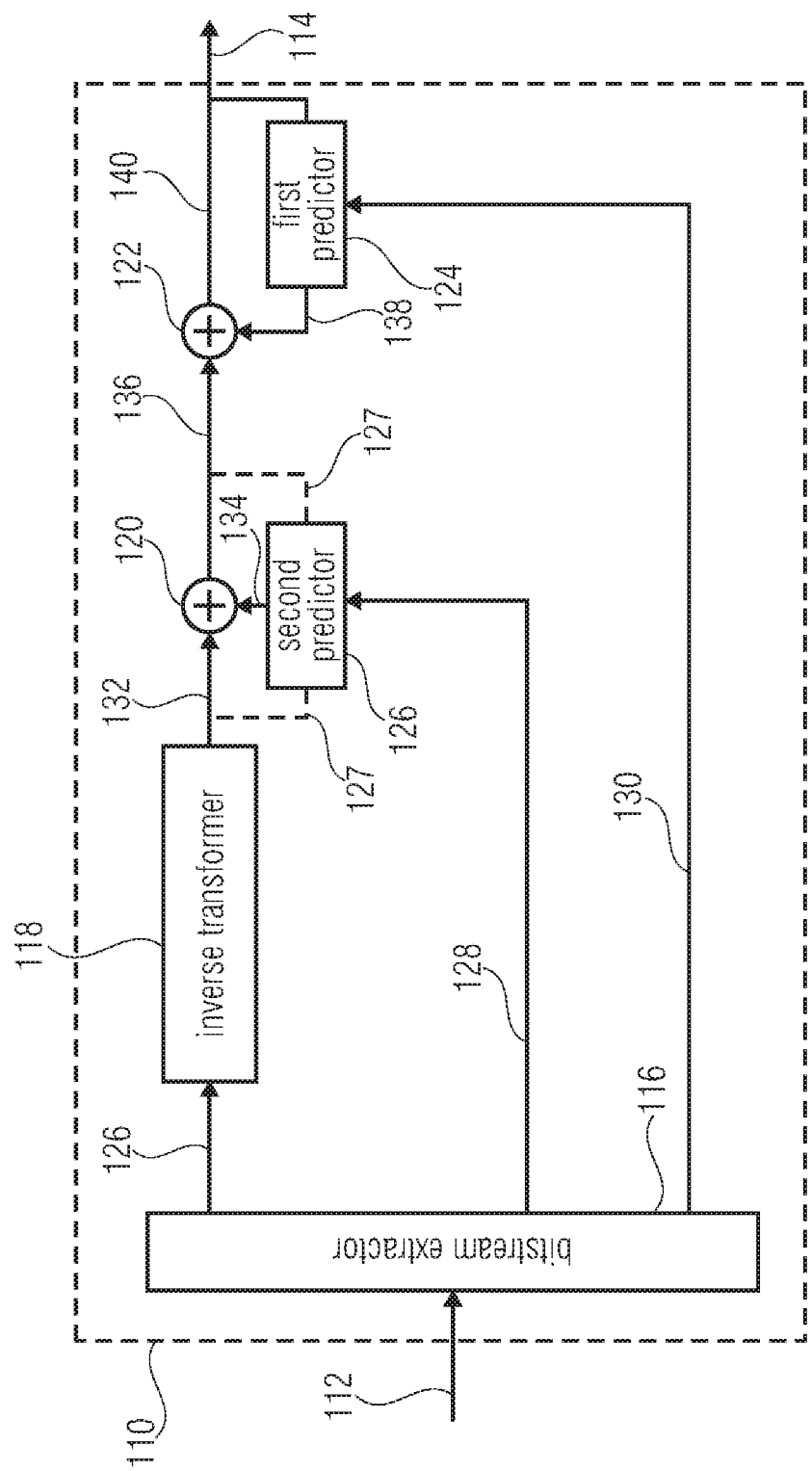
FIG. 2 shows a block diagram of a hybrid video decoder according to an embodiment.

FIG. 2 shows a hybrid video decoder 110 according to an embodiment of the present invention. The hybrid video decoder 110 is configured to reconstruct a video signal from a bitstream with the bitstream entering at input 112 and the reconstructed video being output at output 114. In particular, hybrid video decoder 110 is configured to emulate the predictions performed in the hybrid video encoder. That is, hybrid video decoder 110 predicts the frames of the video and also predicts the residual signal related to the prediction error of the first prediction by motion-compensated prediction using reference residual signals of previously decoded frames.

Hybrid video decoder 110 may internally be construed as shown in FIG. 2. As shown in FIG. 2, hybrid video decoder 110 may comprise a bitstream extractor 116, inverse transformer 118, a first adder 120 and a second adder 122, connected in the order mentioned between input 112 and output 114. Further, hybrid video decoder 110 comprises a first predictor 124 and a second predictor 126. First predictor 124 is connected between an output of adder 122 which is, in turn, also connected to output 114, and a second input of adder 122 which has a first input thereof connected to the output of adder 120. The second predictor 126, in turn, has its input connected to the output of adder 120 or an output of inverse transformer 118 to which a first input of adder 120 is connected. Further, predictor 126 has its output connected to a second input of adder 120. Parameter inputs of predictors 126 and 124 are connected to respective further inputs of bitstream extractor 116.

Briefly describing the functionality of the hybrid video decoder 110 of FIG. 2, bitstream extractor 116 is configured to extract the information from bitstream 112 which enters bitstream generator 22 at the encoding side. Both, bitstream extractor 116 and bitstream generator 122 may be configured to perform the extraction generation by use of entropy coding such as arithmetic or variable length coding. The compression scheme used by bitstream generator 22 and bitstream extractor 116 is lossless. Accordingly, bitstream extractor 116 extracts from the bitstream entering input 112 quantized transform coefficients 126 corresponding to coefficients 42 in FIG. 1, residual prediction motion parameters 128 corresponding to parameters 52 in FIG. 1, and prediction parameters 130 corresponding to parameters 50 in FIG. 1.

The construction and mode of operation of elements 118-126 of FIG. 2 corresponds to the construction and mode of operation of elements 24-32 in FIG. 1. These elements form a video signal reconstruction section of the encoder and decoder, respectively. That is, inverse transformer 118 recovers final residual signal 132 from coefficients 126 with signal 132 corresponding to signal 44 in FIG. 1. The addition of final residual signal 132 for a currently decoded frame and the residual prediction signal 134 of the currently decoded frame as obtained by predictor 126, results in the residual signal 136 of the currently decoded frame. The addition of residual signal 136 and the prediction signal 138 as obtained by predictor 124 results in the reconstruction of the currently decoded frame 140. Predictor 124 is configured to determine the prediction signal 138 predicting the currently decoded frame using previously decoded/reconstructed portions of the video entering predictor 124 by use of parameters 130.

Predictor 126 determines the residual prediction signal 134 by motion-compensated prediction using the motion parameters 128 for the currently decoded frame based on a reference residual signal of a previously decoded frame, namely the residual signal 136 of the previously decoded frame or the final residual signal 132 of the previously decoded frame as illustrated by the dotted lines in FIG. 2.

After having described rather generally an embodiment for a hybrid video encoder and a hybrid video decoder, general concepts in hybrid video coding which may be implemented in embodiments of the present invention are described in the following. In particular, firstly, these details deal with the direct prediction of the frames of the video, i.e. the prediction, the prediction error of which is represented by the residual signal which is also subject to a prediction, the prediction error of which is, in turn, represented by the final prediction signal transmitted within the bitstream.

In hybrid video coding as used by the above encoder and decoder, the color components of a video frame may be predicted either by motion-compensated prediction, using the reconstructed color components of previous frames, or by intra prediction, using previously reconstructed macroblocks of the same frame. This prediction may be performed within predictors 124 and 30, respectively. The residual signal, i.e. the difference between the original color components and the corresponding prediction signals, is subject to a further prediction which prediction is, in case of FIGS. 1 and 2, performed in predictors 32 and 126, respectively. This final residual signal may be coded using transform coding (a combination of a decorrelating transform, quantization of transform coefficients, allowed by entropy coding of the resulting quantization symbols). In case of FIGS. 1 and 2, the transformations are performed by transformer 20 and inverse transformer 118, respectively, and the entropy coding by bitstream generator 22 and bitstream extractor 116, respectively. As far as the first prediction resulting in the intermediate residual signal is concerned, motion-compensated prediction can be done for some sub-regions of a video frame. Usually, the sub-regions are rectangular blocks of samples. But it is also conceptually possible to use the same motion parameters for an arbitrary set of samples. The motion parameters (part of 50 and 130, for example) are included in the bitstream and transmitted to the decoder. It is possible to use arbitrary motion models. For example, the motion may be modeled using a translational motion model; then, a motion vector (2 parameters) specifying a displacement is transmitted for each region. Other common motion models include the affine motion model (6 parameters), 3-, 4-, and 8-parameter models. The motion parameters can be transmitted with arbitrary accuracy. For example, for the translational motion model, the motion vectors could be coded using full-sample accuracy or subsample accuracy (e.g. quarter-sample accuracy). In the first case, the prediction samples can be directly copied from the reconstructed frames (for example, directly from 48 and 140). In the case of sub-sample accurate motion vectors (or general motion parameters), the prediction samples (see, for example, 34 and 138) are interpolated using the reconstructed samples in the reference frame (from, for example, 48 and 140). Possible interpolation methods include FIR filtering or spline interpolation techniques. The filtering may be performed within the predictor 30 and 124 or within some additional entity between adder 28 and 122, respectively, and the respective input of predictor 30 and 124, respectively. Any of the previously transmitted frames can be used for motion compensation. If the reference frame is not fixed by high-level parameters, a reference index (which could be part of 50 and 130, respectively, for example) can be transmitted to identify the used reference frame. It is also possible to modify the prediction signal using a weighting factor and an offset (often referred to as weighted prediction), or any other weighting function to obtain the prediction signal (34 and 138 in FIGS. 1 and 2, respectively, for example). Furthermore, several prediction signals can be combined to obtain the prediction signal (such as 34 and 138). This is referred to as multi-hypothesis prediction. The combined prediction signal can, for example, be obtained by a weighted sum of different prediction signals. The individual prediction signals can stem from different reference frames or the same reference frame. If two prediction signals are combined, the multi-hypotheses prediction may be referred to as bi-prediction. It is, however, also possible to use more than two hypotheses. Entropy coding of the quantized transform coefficients (see 42 and 126 in FIGS. 1 and 2, for example) can be done, for example, by variable-length coding or (adaptive) arithmetic coding (in, for example, 22 and 116).

The just-presented description of details concentrated on the base prediction, i.e. the prediction of the frames themselves. However, the embodiments of the present invention do not stop here. Rather, the residual signal of this base prediction is subject to a further prediction performed by motion-compensated prediction using a reference residual signal of any of the previously encoded/decoded frames. In the following, details regarding this additional prediction are presented.

In accordance with the following details of the embodiments of the present invention, the energy of the residual signal (see 36 and 136, for example) in hybrid video coding is further reduced. This energy reduction is achieved by additionally predicting (see 32 and 126, for example) the residual signal of the current frame (i.e. the difference between the original signal and the motion-compensated or intra prediction signal) using reconstructed residual samples of previously coded frames (entering blocks 32 and 126, respectively, for example). This additional prediction can significantly reduce the energy of the remaining residual signal (40 in FIG. 1, for example). And hence, the resulting residual signal (i.e., for example the quantized transform coefficients) can be represented with less bits for the same reconstruction quality. In order, however, to bring the decoder into a position to emulate the motion-compensated prediction of the residual signal, the motion parameters for the residual prediction are additionally transmitted as side information. Only when the rate for the additionally transmitted motion parameters is smaller than the rate saving for the resulting residual signal, the coding efficiency is improved. In order to guarantee that the additional residual prediction does not decrease the coding efficiency, it is adaptively chosen on the basis of image regions and its usage is signaled to the decoder. The encoder can test the coding with and without the additional motion-compensated residual prediction and chosen the better one, based on a rate-distortion criterion. As rate distortion criterion, the commonly used Lagrangian cost functional $D+\lambda R$ can be used, with D and R representing the resulting distortion and overall rate for the tested image region, respectively. $\lambda$ represents the Lagrangian multiplier that is associated with the target rate.

When describing specific details for possible implementations of embodiments of the present application such as the embodiments of FIGS. 1 and 2, it is sometimes assumed that the hybrid video decoder comprises, or has at least access to, a decoded picture buffer not shown in FIG. 2. In a particular configuration, the frames of reconstructed residual signals (entropy prediction 32 and 126, for example) are inserted into a decoded picture buffer or an additional decoded picture buffer is operated for the reconstructed residual signals.

In the following description, the following signals are used:
original signal: s (cf. 12 in FIG. 1)
(usual) motion-compensated or intra prediction: ŝ (cf. 34 and 138 in FIGS. 1 and 2, respectively)
residual prediction: r̂ (cf. 38 and 134 in FIGS. 1 and 2, respectively)
residual reconstruction: r' (cf. final residual signal 44 and 132 in FIGS. 1 and 2, respectively)
reference residual: r'' (cf. input into blocks 32 and 126 in FIGS. 1 and 2, respectively)
final reconstruction: s'' (cf. 48 and 140 in FIGS. 1 and 2, respectively)

The residual prediction and the reference residual are the ones added in accordance with the present embodiments to conventional hybrid coding solutions using, for example, motion-compensated or intra prediction. Sometimes, the examples of possible specific implementations for the hybrid video decoder and hybrid video encoder, respectively, assume that the granularity at which parameters 52 and 50 and 128 and 130, respectively, define the user prediction and the residual prediction, vary within the bitstream 14 and 112, respectively, in blocks smaller than the units of frames of the video. However, predictor 30 and predictor 32 and even transformer 20 may operate in units smaller than a frame, i.e. in unit of regions of a current frame with this region generally being a set of pictures, such as a rectangular block of the frame, although any other shape of the region is also possible. The region may be simply-connected.

Figure 3:
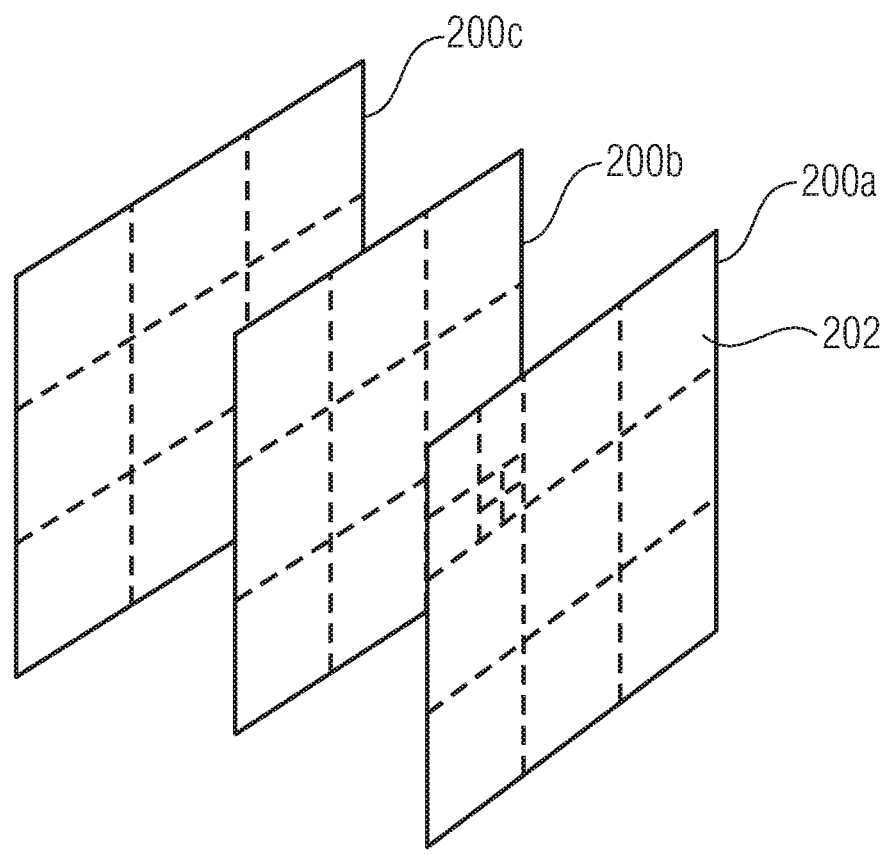
FIG. 3 shows a schematic diagram of a portion of a video according to an embodiment.

In order to illustrate this, reference is made to FIG. 3. FIG. 3 shows three consecutive frames 200a, 200b and 200c. The sequence among frames 200a to 200c may be determined by their consecutive arrangement in time within the video, i.e. by their presentation times. Although the coding/decoding order among the frames of the video may coincide with the order of capturing/presentation times of these frames, this is not necessarily the case. In any case, encoder and decoder use a common decoding order among the frames. As illustrated in FIG. 3, each frame may be subdivided into regions 202 as illustrated by dotted lines. All regions 202 of a frame cover the whole frame laterally. The subdivision of a frame may be such that the regions 202 do not overlap each other as shown in FIG. 3. However, according to an alternative embodiment, regions 202 may overlap each other. The subdivision into regions 202 may correspond to a regular subdivision of the frames 200a into a regular array of equally sized regions 202. Alternatively, a multi-tree subdivision may be used to subdivide each frame, or may be used to further subdivide each, or a subset, of the aforementioned equally sized regions of the regular array. The latter possibility is illustrated in FIG. 3 as visible from the upper-left block in frame 200a. Hybrid video encoder and decoder may use different subdivisions for the usual prediction, the residual prediction and/or the final residual signal encoding, if any. In case of the illustrative construction according to FIGS. 1 and 2, predictors 30, 32 and transformer 20 and predictors 124, 126 and inverse transformer 118 may use the same subdivision or different subdivisions relative to each other. More details in this regard are presented in the following. In any case, any of the just-mentioned subdivisions used for the usual prediction, the residual prediction and the final residual signal en/decoding, may change over time such as from frame to frame or GOP to GOP (GOP=group of pictures). The change may be signaled as side information within the bitstream. In the following, the region in the current frame to be reconstructed is a set of pixels R which is a subset of all pixels in the current frame F:

$$(x, y) \in R_i, \bigcup_i R_i = F \quad (1)$$

Briefly summarizing the above description, a hybrid video decoder according to an embodiment of the present application may be configured to additionally predict a residual signal 36 and 136 of a currently decoded frame such as frame 200a of FIG. 3, by motion-compensated prediction using a reference residual signal 45 and 127 of a previously decoded frame such as, for example, frame 200b of FIG. 3. To this end, a hybrid video decoder may predict the currently decoded frame 200a from previously decoded video portions, such as, for example, the afore-mentioned frame 200b and/or some other frame, such as frame 200c, to obtain a prediction signal 138 of the currently decoded frame 200a, a prediction error of which the residual signal 136 relates to, entropy decode a final residual signal 132 of the currently decoded frame 200a, and reconstruct the currently decoded frame 200a by composing a) the prediction signal 138 of the currently decoded frame 200a, b) a residual prediction signal 134 of the currently decoded frame 200a, obtained by the hybrid video decoder in predicting the residual signal 136 of the currently decoded frame 200a, and c) the final residual signal 132 of the currently decoded frame 200a.

This configuration of the hybrid video decoder and encoder may be extended in the following manner if the hybrid video decoder and encoder are configured to perform the residual prediction in units of the afore-mentioned regions or sets of samples 202.

The motion-compensated residual prediction may be applied to arbitrary sets of samples in the current frame. The set of samples for which motion-compensated residual prediction is applied may or may not be depending on the set of samples for which usual motion-compensated prediction or intra prediction is used. In particular, the following combinations are possible:

The set of samples for which motion-compensated residual prediction (with unique prediction parameters) is applied is equal to the set of samples for which usual motion-compensated prediction or intra prediction (with unique prediction parameters) is applied. See, for example, FIG. 3. According to the just-described alternative, hybrid video decoder and hybrid video encoder would use the same granularity or subdivision of the frames for performing the usual prediction and the residual prediction and setting and transmitting the respective prediction and motion parameters, respectively. In even other words, predictors 126 and 32 may use the same granularity or subdivision as predictors 124 and 30. In that case, one or more syntax elements signaling whether motion-compensated residual prediction is applied are transmitted for each set of samples for which usual motion-compensated prediction is applied and/or for each set of samples for which intra prediction is applied. That is, encoder 10 may be configured to associate an intra prediction mode or motion-compensated prediction mode with each region 202, and for each region 202 predictor 32 and 126 may decide, reflected in the bitstream 14 by one or more respective syntax elements, as to whether motion-compensated residual prediction is to be applied or not. If yes, respective residual prediction motion parameters 52 and 128 are embedded within the bitstream. The signaling whether motion-compensated residual prediction is applied can also be combined with the motion parameters. To be even more precise, the signaling whether motion-compensated residual prediction is applied can be inherently contained within the residual prediction motion parameters 52 and 128, respectively. In such a configuration, it is possible to insert the reconstructed residual samples used for residual prediction (in predictor 32 and 126, respectively), into the afore-mentioned decoded picture buffer and indicate via a reference frame index whether motion compensated residual prediction is used (i.e., no additional syntax element is transmitted, but the reference frame index is re-used in order to specify a reconstructed residual picture as reference picture for motion-compensated prediction). Using the frame indexing in the decoded picture buffer, the optional additional residual prediction may particularly be controlled as follows. The hybrid video decoder 110 may be configured to manage different times of reconstructed frames within the decoded picture buffer, namely reconstructed frames resulting from signal 140, and reconstructed reference residual frames resulting from the final residual signal 132 or the sum of the final residual signal 132 and the residual prediction signal 134. If the bitstream 14 contains within the bitstream residual prediction motion parameters associated with a reference frame index pointing to a frame within the decoded picture buffer representing a reference residual frame, then the appliance of the associated residual prediction motion parameters to this reference residual frame (cf. 52 and 128), results in a residual prediction signal. In the other case, i.e. if the reference frame index points to a frame within the decoded picture buffer, representing a reconstructed frame, then the appliance of the associated motion parameters (cf. 50 and 130), results in a usual prediction. It directly follows that the separate configuration and provision of adders 120, 122 and predictors 126 and 124 in FIG. 2, merely represented a possible implementation possibility, but the separate configuration and provision merely serves for illustrative purposes and needs not to end-up into a duplication of respective hardware, firmware or software components within the hybrid video decoder. Rather, the below-described motion modeling and interpolation for obtaining the reconstruction based on the respective frame within the decoded frame buffer by use of the respective motion parameters, and the addition may be co-used by the usual prediction and the residual prediction with the sort of prediction actually being performed being steered by, or controlled by, the reference frame index and the management of the frames within the decoded picture buffer. It is further possible that two separate decoded picture buffer exist and that reference residual prediction frames and associated reference decoded/reconstructed frames are assigned to the same index in the respective buffer. In that case, the second transmission of motion parameters associated to the same reference frame index and associated to the same set of samples, may be interpreted by the decoder such that the second motion parameter set, for example, is for residual prediction, whereas the first one is for usual prediction. It is further possible, to transmit a syntax element for each set of motion parameters, which species whether these motion parameters are used for usual motion-compensated prediction or motion-compensated residual prediction. In the first case, the motion parameters are within parameters 50, in the second case they are within motion parameters 52.

The set of samples for which motion-compensated residual prediction (with unique prediction parameters) is applied is a subset of the set of samples for which usual motion-compensated prediction or intra prediction (with unique prediction parameters) is applied. See, for example, FIG. 3. If, for example, in FIG. 3 the subdivision of frame 200a into regions 202 was the (first-order) subdivision underlying the usual prediction performed by predictors 30 and 124, respectively, the granularity at which predictors 32 and 126 perform the residual prediction, may be a second order subdivision of this first order subdivision. That is, the regions on which predictors 32 and 126 perform the residual prediction, may be equal to or proper subsets of the regions on which predictors 30 and 124 perform the usual prediction. In that case, one or more syntax elements signalling the partitioning into subsets and, for each of the resulting subsets, whether motion-compensated residual prediction is applied may be transmitted for each set of samples for which usual motion-compensated prediction is applied and/or for each set of samples for which intra prediction is applied. In a particular configuration, the sets of samples and the subsets are rectangular regions of an image.

The set of samples for which motion-compensated residual prediction (with unique prediction parameters) is applied is independent of the sets of samples for which usual motion-compensated prediction or intra prediction (with unique prediction parameters) is applied. For example, the subdivision or granularity at which the usual prediction (cf. 30 and 124) is performed, may be fixed or signaled within the bitstream, and the subdivision at which the residual prediction (cf. 32 and 126) is performed, may be signaled within the bitstream by use of syntax elements which are interpreted at the decoding side—such as by predictor 126—completely independent from the subdivision used for usual prediction (such as predictor 124) at the same currently decoded frame. In that case, one or more syntax elements signalling the set of samples for which motion-compensated residual prediction is applied is transmitted. For instance, this information can be signalled by signalling a partitioning of a frame or any predetermined image region into subsets and signalling for each of these subsets whether motion-compensated residual prediction is applied. In a particular configuration, the sets of samples and the subsets are rectangular regions of an image.

That is, summarizing the above three alternatives, the hybrid video decoder may be configured to decode one or more syntax elements for the currently decoded frame and apply the prediction of the residual signal 136 of the currently decoded frame to a predetermined set of first sets of samples of the currently decoded frame, such as the subsets of regions 202 of frame 200a in FIG. 3, with the predetermined set being defined by the one or more syntax elements. Additionally considering the usual prediction, the hybrid video decoder may be configured to apply a prediction, namely the usual prediction, of the currently decoded frame resulting in a prediction signal 138 of the currently decoded frame, such as frame 200*a*, a prediction error of which the residual signal 136 relates to, to (the currently decoded frame 200*a* in units of) second sets of samples of the currently decoded frame 200*a*, namely regions of another subdivision of frame 200*a* not shown in FIG. 3, for example, wherein the hybrid video decoder may decode one or more syntax elements for each of the second sets of samples, and use the one or more syntax elements for each of the second sets of samples to identify the predetermined set of first sets of samples out of the second sets of samples (in which case the subdivision or granularity for the usual prediction and the residual prediction are the same) or out of subsets of the second sets of samples (in which case the residual prediction subdivision represents a second stage subdivision relative to the subdivision for the usual prediction). Further, the hybrid video decoder may be configured to decode one or more syntax elements for the currently decoded frame 200*a* and apply the prediction of the residual signal 136 of the currently decoded frame 200*a* to a predetermined set of first sets of samples of the currently decoded frame, such as regions 202 in FIG. 3, with the predetermined set among regions 202 being defined by the one or more syntax elements, and apply an intra-prediction of the currently decoded frame 200*a* partially forming the prediction signal 138 of the currently decoded frame 200*a*, to a predetermined first set of second sets of samples of the currently decoded frame 200*a* and a motion-compensated prediction of the currently decoded frame 200*a* partially forming the prediction signal, to a predetermined second set of the second sets of samples, so that the first sets of samples is independent from the first and second sets of the second sets of samples. In other words, as mentioned in the above-identified third alternative, the one or more syntax elements defining the subdivision into the first sets of samples may be transmitted within the bitstream and used by the hybrid video decoder such that the subdivision into these first sets of samples used for residual prediction, subdivides the currently decoded frame independent from the subdivision of the currently decoded frame into the second sets of samples, at the granularity of which the usual prediction and the decision as to whether motion-compensated usual prediction or intra-prediction is to be used, is performed.

Details regarding possible alternatives of how to perform the motion-compensated residual prediction are described in the following.

Similar to the usual motion-compensated prediction, multiple reference pictures, multi-hypotheses prediction, weighted prediction, and multiple motion models can be used for the motion-compensated residual prediction.

Multiple reference pictures: The concept of multiple reference pictures specifies that multiple reconstructed residual frames are available for motion-compensated residual prediction. The reconstructed residual frames can be inserted into the decoded picture buffer, or an additional decoded picture buffer is operated for reconstructed residual pictures. An indication which reconstructed residual frame is used for motion-compensated residual can be signalled in the bitstream. In a particular configuration this indication can be inferred by the decoding process. In other configurations, this indication is signalled for a frame, or a slice, or a set of samples. In the latter case, the set of samples can be the set of samples for which motion-compensated residual prediction is applied (with unique parameters) or it can be a superset of a set of samples for which motion-compensated residual prediction is applied. This indication can be a reference frame index that specifies a position in a list of reconstructed residual frames or a list of both reconstructed residual frames and reconstructed frames:

$$t_0, t(h), h=0 \ldots H \quad (2)$$

That is, the current state of the decoded picture buffer or decoded picture buffers in case of separated decoded picture buffers being used for residual prediction and usual prediction, may be determined by the index to the currently decoded frame, i.e. $t_o$, and the indexing of a certain frame within this decoded picture buffer or decoded picture buffers for the individual hypotheses H may be performed via index list t(.) with H denoting the number of hypotheses.

The list of reconstructed residual frames or reconstructed residual frames and reconstructed frames is derived based on the status of the decoded picture buffer or the status of the decoded picture buffer for reconstructed pictures and the status of the decoded picture buffer for reconstructed residual frames and, potentially, other high-level (e.g. slice header) syntax elements.

In summarizing the above, the hybrid video decoder may be configured to extract a residual reference frame index indexing the previously decoded frame using the reference residual signal of which the residual signal of the currently decoded frame is to be predicted, from the bitstream.

In a particular configuration, the reference frame index is not signaled, but inferred in the decoder to represent the reconstructed residual signal for the frame that is used for the usual motion-compensated prediction. That is, the hybrid video decoder may be configured to infer the residual reference frame index indexing the previously decoded frame using the reference residual signal of which the residual signal of the currently decoded frame is to be predicted, to represent a further previously decoded frame, based on which the hybrid video decoder is configured to determine the prediction signal of the currently decoded frame, the prediction error of which the residual signal relates to.

Multi-hypothesis prediction and weighted prediction: One or more motion-compensated residual prediction signals can be combined to form the final motion-compensated residual prediction signal. A motion-compensated residual prediction signal is also referred to as hypothesis. The following concepts are particularly considered for forming the final motion-compensated prediction signal:

The final motion-compensated residual prediction signal is formed by a weighted sum of the hypotheses. For each hypothesis, a weighting factor is signaled (either on a slice basis or on the basis of a set of samples). In a particular configuration, an additional o set can be also signaled, either one o set for each hypotheses or only one offset.

Each sample of the residual prediction signal for a hypotheses is weighted by a sample-depending value. If the set of samples represents a rectangular image region, this can be seen as a weighting matrix. The used weighting values (weighting matrices for rectangular image regions) can be signaled via an indication in the bitstream. For example, it is possible to store predetermined sets of weighting values (weighting matrices for rectangular image regions) in both encoder and decoder and transmit an indication which of the sets is chosen. Additional sets of weighting values can also be transmitted inside the bitstream. The weighted hypotheses are added up to form the final motion-compensated residual prediction signal. In a particular configuration, an additional offset can be also signaled, either one offset for each hypotheses or only one offset.

The above methods for modifying the residual prediction signal of a hypothesis can also be used when only a single hypothesis is used for motion-compensated residual prediction.

The hypotheses can also be first summed up. And then the resulting hypotheses can be scaled with a weighting factor or a set of weighting values. In a particular configuration, an additional offset can be also used.

A weighting factor for a residual prediction signal is also referred to as gain. And a set of weighting values (weighting matrices for rectangular image regions) is also referred to as set of gains (gain matrices for rectangular image regions).

Spatial displacement parameters: Depending on the employed motion model, the spatial displacement parameters can be different for a set of samples for which motion-compensated residual prediction (using unique motion parameters) is applied. The spatial displacements can be derived based on a set of transmitted motion parameters and the employed motion model. The spatial displacement (u, v) are two values for x and y direction, their derivation can be generalized as:

$$u = \sum_i a_i \phi_i \quad (3a)$$

$$u = \sum_i b_i \varphi_i \quad (3b)$$

In particular, the following motion models are considered:

Translational motion model: The motion parameters ($u=a_0$ and $v=b_0$) correspond to a translational motion vector for each set of samples for which motion-compensated residual prediction is applied.

Affine motion model: 6 motion parameters representing affine motion parameters are signaled to specify the displacement vectors for the set of samples for which motion-compensated residual prediction is applied.

General linear motion model: N motion parameters are signaled to specify the displacement vectors for the set of samples for which motion-compensated residual prediction is applied. The displacement vectors for the set of samples for which motion-compensated residual prediction is applied are determined using the equations specified above.

Different sets of samples and different hypotheses for a set of samples might use different motion models. In particular, the following configurations are considered:

The same motion model is used for all sets of samples in a slice. No signaling of the motion model is necessitated (except, perhaps at the slice level). Only the motion parameters for the chosen model are transmitted for each hypothesis of each set of samples for which motion-compensated residual prediction is applied.

Different motion models are used for different sets of samples, but the same motion model is used for all hypotheses for a set of samples for which motion-compensated residual prediction is applied. The motion model is signaled for each set of samples for which motion-compensated residual prediction is applied.

Different motion models are used for different sets of samples, and different motion models are used for all hypotheses for a set of samples for which motion-compensated residual prediction is applied. The motion model is signaled for each hypothesis of set of samples for which motion-compensated residual prediction is applied.

The motion parameters can be transmitted with varying accuracy. The motion parameter accuracy can be fixed, or it can be signaled at a slice level or the level of subsets of a slice. In particular, when a translational motion model is used, the motion vector can be transmitted with full-sample accuracy or sub-sample accuracy (e.g. quarter-sample accuracy). If a translational motion model is used with full-sample accurate motion vectors, the residual prediction signal can be obtained by copying the samples of the reference residual frame. In most other cases, the reference reconstructed residual signal has to be interpolated. As interpolation method, FIR filters (depending on the sub-sample position) or generalized interpolation (e.g. B-spline interpolation) can be used.

In a particular configuration, one or more of the motion parameters are predicted using already transmitted information and only the difference between the motion parameters and their predictions is transmitted. The following concepts can be used for motion parameter prediction:

The motion parameters are predicted using the motion parameters (for residual prediction) of already coded sets of samples (e.g. neighbouring blocks) inside the same frame.

The motion parameters are predicted using the motion parameters for the usual motion-compensated prediction of the same set of samples and/or already transmitted sets of samples for the same frame.

The motion parameters are predicted using the motion parameters (for residual prediction) of already coded sets of samples in previously coded frames (e.g. by the motion parameters of co-located blocks in previous frames).

The motion parameters are predicted using the motion parameters for the usual motion-compensated prediction of already coded sets of samples in previously coded frames (e.g. by the motion parameters of co-located blocks in previous frames).

The motion parameters are predicted by using any combination of the above concepts or by directly signalling the motion parameter prediction method.

Briefly summarizing some of the just-mentioned options, the hybrid video decoder may thus be configured to predict residual prediction motion parameters 128 used in predicting the residual signal of the currently decoded frame, such as frame 200a, for a predetermined set of samples of the currently decoded frame 200a, such as the region representatively indicated by 202 in FIG. 3, using motion parameters previously used by the hybrid video decoder in determining a prediction signal 138 of the currently decoded frame 200a a prediction error of which the residual signal 136 relates to, for another set of samples, such as a region of frame 200a, neighboring region 202, or the same set of samples of the currently decoded frame 200a, or previously used by the hybrid video decoder in determining a prediction signal 138 of a previously decoded frame, such as frame 200b, for example, for a region co-located to the representative region 202.

In a particular configuration, the motion parameters are not signaled directly. Instead a set of potential motion parameters is derived at the decoder side and only an index is signaled that specifies which of the potential motion parameters is used. This index can be further predicted using the coded indices of already transmitted sets of samples.

Next, more detailed embodiments for the signal reconstruction in general as performed by the hybrid video encoder or hybrid video decoder are described in more detail below. The signal reconstruction involves, as described above, generally the usual prediction as well as the residual prediction and accordingly, in the following description, various details are described as to how the hybrid video encoder and hybrid video decoder, respectively, may generally operate, and, exemplarily, how the predictors of the same in FIGS. 1 and 2 may operate.

Usual prediction signal: A set of samples is predicted either by intra prediction or motion-compensated prediction. It is also possible that two or more intra- or motion-compensated prediction signals are combined in order to form the final prediction signal for a set of samples. When considering motion compensated prediction, the prediction samples of up to $H_{vid}$ hypotheses are scaled with corresponding weighting factors $w_{vid,h}$ and added up.

$$\hat{s}_{t_0}(x, y) = \sum_{h=0}^{H_{vid}} w_{vid,h} s_{t(h)}^H (x + u_{vid,h}, y + v_{vid,h}) \quad (4)$$

For each hypotheses, the current region is moved in the reference frame according to the video spatial displacement. Sub-sample interpolation can be used for generating the prediction signal for a hypotheses. It is also possible to add an offset to obtain the final prediction signal.

Residual Prediction: If residual prediction is used for a set of samples, the final residual prediction signal is obtained by weighting the prediction signals for the hypotheses and add up the weighted residual prediction signals for the hypotheses.

$$\hat{r}_{t_0}(x, y) = \sum_{h=0}^{H_{res}} w_{res,h} r_{t(h)}''(x + u_{res,h}, y + v_{res,h}) \quad (5)$$

The weighting can be done by a weighting factor per hypotheses or by a set of weighting values per hypothesis, e.g. weighting matrices for rectangular sets of samples (see above). For each hypotheses, the current region is moved in the reference residual frame according to the spatial displacement information. Sub-sample interpolation can be used for generating the residual prediction signal for a hypotheses. It is also possible to add an offset to obtain the final residual prediction signal.

Generation of the reference residual: There are basically two different ways how the reference residual frames can be constructed:

The residual reference frames are built by the part of the residual signal that is encoded by transform coding:

$$r''_{t_0}(x,y) = r'_{t_0}(x,y) \quad (6)$$

The residual reference frames are built by the reconstructed residual, i.e. by the sum of the residual prediction signal (if available) and the part of the residual that is encoded by transform coding $$r''_{t_0}(x,y) = r'_{t_0}(x,y) + \hat{r}_{t_0}(x,y) \quad (7)$$

The following configurations are considered:
All residual reference frames are built in the same way. It is selected on a frame level, how the reference residual frames are built.

Both possible reference residual frames are inserted in the decoded picture buffer, and it is signaled (e.g. via the reference frame index) which of the reference residual frames is used for residual prediction.

Summarizing the alternatives described in connection with equations 6 and 7, the hybrid video decoder may be configured to entropy decode a final residual signal 132 of the previously decoded frame, such as frame 200b, and build the reference residual signal 127 of the previously decoded frame by the final residual signal 132 of the previously decoded frame 200b. In other words, hybrid video decoders may use the final residual signal 132 as the reference residual signal 127 of the previously decoded frame from which the residual signal 136 of the currently decoded frame 200a is predicted.

Alternatively, the hybrid video decoder may be configured to entropy-decode the final residual signal of the previously decoded frame 200b, predict the residual signal 136 of the previously decoded frame 200b by motion-compensated prediction using a reference residual signal of an even more previously decoded frame, such as frame 200c to obtain a residual prediction signal 134 of the previously decoded frame 200b, and build the reference residual signal 127 of the previously decoded frame by a sum of the final residual signal 132 of the previously decoded frame 200b and the residual prediction signal 134 of the previously decoded frame.

As described above, however, the hybrid video decoder may even be configured to select on a frame basis, which building scheme to use. And even alternatively, the hybrid video decoder may be configured to perform both building schemes in order to insert respective candidate reference residual signals according to equation 6 and equation 7, respectively, into a decoded picture buffer of the hybrid video decoder, with using the first or second candidate reference residual signal as the reference residual signal of the previously decoded frame depending on a signalization within the bitstream.

Final reconstruction: The reconstructed video signal which can also be used as reference (for usual motion-compensated prediction) is composed of the two predictions (the usual intra or motion-compensated prediction and, if available, the residual prediction) and the final residual that is transmitted by transform coding:

$$s''_{t_0}(x,y) = s'_{t_0}(x,y) + \hat{r}_{t_0}(x,y) + r'_{t_0}(x,y) \quad (8)$$

Figure 4B:
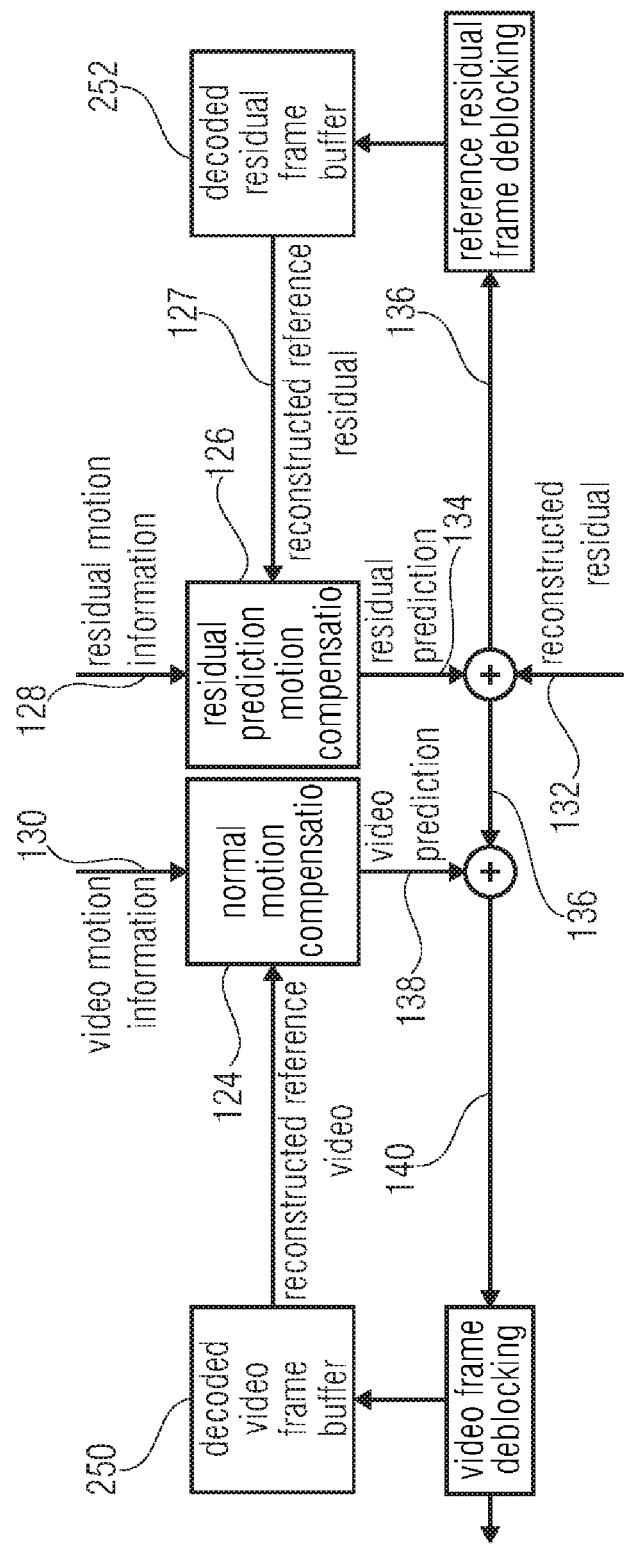

The alternatives in the reconstruction as set out above in the various embodiments, are summarized in FIGS. 4a and 4b, using the same reference signs as already used in FIGS. 1 and 2. FIGS. 4a and 4b are embodiments according to which separate decoded frame buffers are used for residual reference frames and the video reference frames, namely a decoded video frame buffer 250 for the video prediction and a decoded residual frame buffer 252 for the residual prediction. Both are connected to the reference signal input of the respective predictor 124 and 126, respectively. However, as already noted above, one decoded frame buffer may be used for storing both, the usual prediction frames and the residual prediction frames. Further, FIGS. 4a and 4b show that, optionally, the deblocking filters 254 and 256, respectively, may be arranged in front of the respective buffers 250 and 252, in order to perform a deblocking on the reference frames before used for motion-compensated prediction, i.e. the usual prediction and the residual prediction, respectively.

Thus, as has been briefly indicated with respect to FIGS. 4a and 4b, to reduce block artifacts, both the reference residual frames and/or the reconstructed signal can generally be deblocked in-loop before inserted in the decoded frame buffer. The deblocking can also be applied as a post filter before displaying or storing the reconstructed video.

As described next, overlapped motion-compensation may be used in connection with the above-described embodiments. In a particular configuration, overlapped motion compensation can be used for either or both the usual motion-compensated prediction and the motion-compensated residual prediction.

The overlapped region used in overlapped motion compensation is a set of pixels R' containing the pixels of region R which is a subset of all pixels in the current frame F:

$$(x', y') \in R'_i, R_i \subseteq R'_i, \bigcup_i R'_i = F \qquad (9)$$

Instead of predicting pixels in the regions $R_i$, the pixels of the overlapping regions $R'_i$ may be predicted. This leads to a superposition of predictions in the overlapping regions. Because of this successive superposition, the overlapped predictions $\hat{s}_{o,t_0}$ and $\hat{r}_{o,t_0}$ have to be initialized with zero:

$$\hat{s}_{o,t_0}(x,y) = \hat{r}_{o,t_0}(x,y) = (0,0), \forall (x,y) \in F \qquad (10)$$

Residual and video signals in the overlapped regions are predicted $\hat{s}_{t_0}(x', y')$, $\hat{s}_{t_0}(x', y')$ and filtered with the window function $F = f(x', y') \forall (x', y') \in R'$:

$$\hat{r}_{o,t_0}(x',y') = \hat{r}_{o,t_0}(x',y') = f_{res}(x',y')\hat{r}_{t_0}(x',y') \qquad (11)$$

$$\hat{s}_{o,t_0}(x',y') = \hat{s}_{o,t_0}(x',y') = f_{vid}(x',y')\hat{s}_{t_0}(x',y') \qquad (12)$$

Reconstruction of the video signal from the overlapped predictions and the reconstructed residual:

$$s''_{t_0}(x,y) = \hat{s}_{o,t_0}(x,y) + \hat{r}_{o,t_0}(x,y) + r'_{t_0}(x,y), \forall (x,y) \in F \qquad (13)$$

Up to now, the specific details in accordance with specific embodiments mainly dealt with the different possibilities in connection with the residual prediction itself. Next, the description focuses on the prediction data reconstruction, i.e. the way the hybrid video decoder may reveal, and the hybrid video encoder may have embedded, the parameters controlling the motion-compensated residual prediction from/into the bitstream.

As shown in FIG. 5, up to three stages may be involved in reconstructing the parameters needed to reconstruct the video signal: entropy decoding 300, dequantization 392 and syntax elements to prediction parameters conversion 304. That is, the bits 306 of the bitstream enter the entropy decoding stage 300, resulting in quantized syntax elements 308 which, in turn, are subject to the dequantization in dequantization module 302. The dequantized syntax elements 310 resulting therefrom are subject to the syntax elements to prediction parameter conversion in module 304, in order to obtain the parameters 312 actually representing the above-identified entities, such as reference frame index, motion parameters, partitioning/subdivision information, weighting, etc. The entropy decoding 300 may be performed by the bitstream extractor 116. The dequantization 302 may either be performed by bitstream extractor 116 or by any of the subsequent modules 118, 126 and 124, respectively, or any other entity therebetween. The same applies with respect to the syntax to parameters module 304.

Entropy Decoding (300): The bitstream may be decoded into syntax elements using entropy coding. This can be for example variable length coding (VLC), context adaptive VLC (by switching VLC tables based on certain criteria), or context adaptive arithmetic coding (CABAC).

Context Determination (optional part of 300): In CABAC (and context adaptive VLC), the contexts for probability derivation (and VLC table switching) can be chosen as a function of already transmitted syntax elements and/or decoded parameters.

The context used for decoding syntax elements related to the reference frame indications of the residual prediction can be selected by evaluating spatial neighboring or temporal co-located already reconstructed reference frame indications of the residual or the video prediction or both. The context used for decoding syntax elements related to the reference frame indications of the video prediction can be selected by evaluating spatial neighboring or temporal co-located already reconstructed reference frame indications of the residual or the video prediction or both.

The context used for decoding syntax elements related to the spatial displacement of the residual prediction (residual prediction motion parameters) can be selected by evaluating spatial neighboring or temporal co-located already reconstructed motion parameters, spatial displacements, or reference frame indications of the residual or the video prediction or both.

The context used for decoding syntax elements related to the spatial displacement of the video prediction (usual prediction motion parameters) can be selected by evaluating spatial neighbouring or temporal co-located already reconstructed motion parameters, spatial displacements, or reference frame indications of the residual or the video prediction or both.

The context used for decoding syntax elements related to the weighting parameters of the residual prediction (reference signal weights) can be selected by evaluating the coefficients s of the reconstructed residual or the motion parameters or the reference frame indications or any combination of those.

Dequantization (302): If a syntax element (for example, the gain) is quantized in the encoder, it has to be dequantized (scaled) before it is used in the decoder.

Syntax Elements To Prediction Parameters Conversation (306): As mentioned above, in order to reduce the bitrate of syntax elements further, the syntax elements can be coded as difference between a parameter predictor and the parameter.

For the following description, we use the concept of general parameter sets. A parameter set PS depends on the number of hypotheses for video and residual prediction, $H_{vid}$, $H_{res}$:

$$PS = \{r', f_{vid}, f_{res}\}$$

$$\cup \{u_{vid,h}, v_{vid,h}, w_{vid,h}, t(h) | h = 0 \ldots H_{vid}\}$$

$$\cup \{u_{res,h}, v_{res,h}, w_{res,h}, t(h) | h = 0 \ldots H_{res}\} \qquad (14)$$

In general, the prediction $\hat{p}$ of a parameter $p \in PS$ can be represented as function $f( )$ of other parameters which are already available because they have been already reconstructed. These can be other parameters P of the same region $R_i$:

$$P \subseteq PS \setminus \{p\} \qquad (15a)$$

$$\hat{p} = f(P_{ROS}) \qquad (15b)$$

or other parameters as well as the same parameter from a region of support (ROS). Such a region can be a already reconstructed neighboring region as well a region from already reconstructed frames:

$$P_{ROS} \subseteq PS_{ROS} \qquad (16a)$$

$$\hat{p} = f(P_{ROS}) \quad (16b)$$

or both:

$$P_{both} \subseteq PS_{ROS} \cup P \quad (17a)$$

$$\hat{p} = f(P_{both}) \quad (17b)$$

In the next paragraphs, such parameter predictions are described.

Number of Hypotheses: The number of residual hypotheses can be coded as difference from the number of video hypotheses and vice versa. A prediction by evaluating the number of video or residual hypotheses of a region of support is also possible.

Residual Coefficients: If the predictions of the video and the residual signal are good approximations of the original video signal, no residual coefficients have to be coded. If the spatial displacement is as well fair enough approximated by a predictor, it only has to be signaled that the predictions are used without prediction error. This can be the case for background regions with no noise.

Motion parameters: The motion parameters can be predicted by using already decoded motion parameters or spatial displacement of neighboring regions or temporal co-located regions (see also discussion above). These regions would then be the region of support. The residual motion parameters can be derived from the usual motion parameters of the current region, from usual motion parameters of the region of support or from both as well as in combination with residual motion parameters from the region of support. The same scheme is applicable to the usual motion parameters using usual motion parameters from the region of support and residual motion parameters from the region of support and the current region.

Reference frame indications: The reference frame indications can be predicted from reference frame indications of spatial and temporal co-located regions as well (see also discussion above). If a reference frame indication is used in most of these regions, the current reference frame indication is likely to be the same. Again, residual reference frame indications can be predicted using the usual reference frame indications and vice versa.

Reference signal weights: The weights $w_{res}$ applied on the reference residual signals can be predicted by analyzing the reconstructed residual. Depending on the prediction, a transmission of a prediction error can be skipped. Thus the weights would be derived from the reconstructed residual. The derived weights can be scalar or they can be extended to a weighting matrix. See also discussion above.

Thus, in the above embodiments, the color components of a video frame are predicted by either motion-compensated prediction or intra prediction. The difference between the original color components and the corresponding prediction signals, also referred to as the residual signal, is not directly transmitted. Rather, in order to further reduce the energy of the residual signal and thus increase the coding efficiency, the residual signal is additionally predicted by motion-compensated prediction using the reconstructed residual signals of previously coded frames.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded video signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] J. T. Gisladottir and M. T. Orchard. Motion-only video compression. In Proc. ICIP-94. IEEE International Conference Image Processing, volume 1, pages 730 734, 13 16 Nov. 1994.

[2] Shangwen Li, Sijia Chen, Jianpeng Wang, and Lu Yu. Second order prediction on h.264/avc. In Proc. Picture Coding Symposium PCS 2009, 6-8 May 2009.

The invention claimed is:

1. Hybrid video decoder comprising a computer programmed to, or a microprocessor configured to:
predict a reference frame of a video by intra prediction or motion-compensated prediction to obtain a prediction signal of the reference frame;
predict a residual signal of the reference frame, which relates to a prediction error of the prediction signal of the reference frame, by motion-compensated prediction from a reference residual signal of a further reference frame of the video to obtain a residual prediction signal of the reference frame;
entropy decode a final residual signal of the reference frame;
reconstruct the reference frame by summing
the prediction signal of the reference frame;
the residual prediction signal of the reference frame; and
the final residual signal of the reference frame,
predict a predetermined frame of the video by intra prediction or motion-compensated prediction to obtain a prediction signal of the predetermined frame;
predict a residual signal of the predetermined frame, which relates to a prediction error of the prediction signal of the predetermined frame, by motion-compensated prediction from a reference residual signal of the reference frame to obtain a residual prediction signal of the predetermined frame;
entropy decode a final residual signal of the predetermined frame; and
reconstruct the predetermined frame by summing
the prediction signal of the predetermined frame;
the residual prediction signal of the predetermined frame; and
the final residual signal of the predetermined frame.

2. Hybrid video decoding method comprising:
predicting a reference frame of a video by intra prediction or motion-compensated prediction to obtain a prediction signal of the reference frame;
predicting a residual signal of the reference frame, which relates to a prediction error of the prediction signal of the reference frame, by motion-compensated prediction from a reference residual signal of a further reference frame of the video to obtain a residual prediction signal of the reference frame;
entropy decoding a final residual signal of the reference frame, and
reconstructing the reference frame by summing
the prediction signal of the reference frame;
the residual prediction signal of the reference frame; and
the final residual signal of the reference frame;
predicting a predetermined frame of the video by intra prediction or motion-compensated prediction to obtain a prediction signal of the predetermined frame;
predicting a residual signal of the predetermined frame, which relates to a prediction error of the prediction signal of the predetermined frame, by motion-compensated prediction from a reference residual signal of the reference frame to obtain a residual prediction signal of the predetermined frame;
entropy decoding a final residual signal of the predetermined frame, and
reconstructing the predetermined frame by summing
the prediction signal of the predetermined frame;
the residual prediction signal of the predetermined frame; and
the final residual signal of the predetermined frame.

3. Hybrid video decoding method according to claim 2, further comprising building the reference residual signal of the reference frame by a sum of the final residual signal of the reference frame and the residual prediction signal of the reference frame.

4. Hybrid video decoding method according to claim 2, further comprising:
selecting, for the predetermined frame, to
build the reference residual signal of the reference frame by the final residual signal of the reference frame, or
build the reference residual signal of the reference frame by a sum of the final residual signal of the reference frame and the residual prediction signal of the reference frame; and
selecting, for the reference frame, to
build the reference residual signal of the further reference frame by a final residual signal of the further reference frame, or
build the reference residual signal of the further reference frame by a sum of the final residual signal of the further reference frame and a residual prediction signal of the further reference frame.

5. Hybrid video decoding method according to claim 2, further comprising:
building a first candidate reference residual signal of the reference frame by the final residual signal of the reference frame and inserting the first candidate reference residual signal in a decoded picture buffer,
building a second candidate reference residual signal of the reference frame by a sum of the final residual signal of the reference frame and the residual prediction signal of the reference frame, and inserting the second candidate reference residual signal into the decoded picture buffer, and
using the first or second candidate reference residual signal as the reference residual signal of the reference frame depending on a signalization within a bitstream.

6. Hybrid video decoding method according to claim 2, further comprising:
  entropy decoding information on residual prediction motion parameters for the predetermined frame, and
  using the residual prediction motion parameters in predicting the residual signal of the predetermined frame.

7. Hybrid video decoding method according to claim 6, further comprising:
  entropy decoding information on video prediction motion parameters for the predetermined frame, and
  predicting the predetermined frame by motion-compensated prediction using the video prediction motion parameters to obtain the prediction signal of the predetermined frame, a prediction error of which the residual signal of the predetermined frame relates to.

8. Hybrid video decoding method according to claim 2, further comprising:
  decoding one or more syntax elements for the predetermined frame; and
  applying the prediction of the residual signal of the predetermined frame to a predetermined set of first sets of samples of the predetermined frame, the predetermined set being defined by the one or more syntax elements.

9. Hybrid video decoding method according to claim 8, further comprising:
  applying the prediction of the predetermined frame resulting in the prediction signal of the predetermined frame to second sets of samples of the predetermined frame,
  decoding one or more syntax elements for each of the second sets of samples, and
  using the one or more syntax elements for each of the second sets of samples to identify the predetermined set of the first sets of samples out of the second sets of samples.

10. Hybrid video decoding method according to claim 2, further comprising:
  decoding one or more syntax elements for the predetermined frame and applying the prediction of the residual signal of the predetermined frame to a predetermined set of first sets of samples of the predetermined frame, the predetermined set being defined by the one or more syntax elements, and
  applying an intra prediction of the predetermined frame partially forming the prediction signal of the predetermined frame to a predetermined first set of second sets of samples of the predetermined frame, and a motion-compensated prediction of the predetermined frame partially forming the prediction signal of the predetermined frame, to a predetermined second set of the seconds sets of samples.

11. Hybrid video decoding method according to claim 2, further comprising extracting a residual reference frame index indexing the reference frame, from a bitstream.

12. Hybrid video decoding method according to claim 2, further comprising:
  inferring a residual reference frame index indexing the reference frame; wherein
  the reference frame is the one based on which the prediction signal of the predetermined frame is determined.

13. Hybrid video decoding method according to claim 2, further comprising predicting residual prediction motion parameters used in predicting the residual signal of the predetermined frame for a predetermined set of samples of the predetermined frame, using residual prediction motion parameters previously used in predicting the residual signal of the predetermined frame for another set of samples of the predetermined frame, or the residual signal of the reference frame.

14. Hybrid video decoding method according to claim 2, further comprising predicting residual prediction motion parameters used in predicting the residual signal of the predetermined frame for a predetermined set of samples of the predetermined frame using motion parameters previously used in determining the prediction signal of the predetermined frame, a prediction error of which the residual signal relates to, for another set or the same set of samples of the predetermined frame, or previously used in determining the prediction signal of the reference frame.

15. Hybrid video decoding method according to claim 2, wherein multi-hypothesis prediction is used to predict the residual signal of the predetermined frame.

16. Hybrid video decoding method according to claim 2, wherein:
  the hybrid video decoding method further comprises
    selecting, for the predetermined frame, to
      build the reference residual signal of the reference frame by the final residual signal of the reference frame, or
      build the reference residual signal of the reference frame by a sum of the final residual signal of the reference frame and a residual prediction signal of the reference frame; and
    selecting, for the reference frame, to
      build the reference residual signal of the further reference frame by a final residual signal of the further reference frame, or
      build the reference residual signal of the further reference frame by a sum of the final residual signal of the further reference frame and a residual prediction signal of the further reference frame, or
  the hybrid video decoding method further comprises
    building a first candidate reference residual signal of the reference frame by the final residual signal of the reference frame and inserting the first candidate reference residual signal in a decoded picture buffer,
    building a second candidate reference residual signal of the reference frame by a sum of the final residual signal of the reference frame and a residual prediction signal of the reference frame, and inserting the second candidate reference residual signal into the decoded picture buffer, and
    using the first or second candidate reference residual signal as the reference residual signal of the reference frame depending on a signalization within a bitstream.

17. Hybrid video decoding method according to claim 16, further comprising:
  decoding one or more syntax elements for the predetermined frame; and
  applying the prediction of the residual signal of the predetermined frame to a predetermined set of first sets of samples of the predetermined frame, and applying the prediction of the predetermined frame to second sets of samples of the predetermined frame, decoding one or more syntax elements for each of the second sets of samples, and using the one or more syntax elements for each of the second sets of samples to identify the predetermined set of the first sets of samples out of the second sets of samples.

18. Hybrid video encoder comprising a computer programmed to, or a microprocessor configured to:
predict a reference frame of a video by intra prediction or motion-compensated prediction to obtain a prediction signal of the reference frame;
predict a residual signal of the reference frame, which relates to a prediction error of the prediction signal of the reference frame, by motion-compensated prediction from a reference residual signal of a further reference frame of the video to obtain a residual prediction signal of the reference frame;
entropy encode a final residual signal of the reference frame representing a difference between the reference frame and a sum of
the prediction signal of the reference frame; and
the residual prediction signal of the reference frame,
predict a predetermined frame by intra prediction or motion-compensated prediction to obtain a prediction signal of the predetermined frame;
predict a residual signal of the predetermined frame, which relates to a prediction error of the prediction signal of the predetermined frame, by motion-compensated prediction from a reference residual signal of the reference frame to obtain a residual prediction signal of the predetermined frame;
entropy encode a final residual signal of the predetermined frame representing a difference between the predetermined frame and a sum of
the prediction signal of the predetermined frame; and
the residual prediction signal of the predetermined frame.

19. Hybrid video decoding method according to claim 2, further comprising building the reference residual signal of the reference frame by the final residual signal of the reference frame.

20. Hybrid video encoding method comprising:
predicting a reference frame of a video by intra prediction or motion-compensated prediction to obtain a prediction signal of the reference frame;
predicting a residual signal of the reference frame, which relates to a prediction error of the prediction signal of the reference frame, by motion-compensated prediction from a reference residual signal of a further reference frame of the video to obtain a residual prediction signal of the reference frame;
entropy encoding a final residual signal of the reference frame representing a difference between the reference frame and a sum of
the prediction signal of the reference frame; and
the residual prediction signal of the reference frame;
predicting a predetermined frame by intra prediction or motion-compensated prediction to obtain a prediction signal of the predetermined frame;
predicting a residual signal of the predetermined frame, which relates to a prediction error of the prediction signal of the predetermined frame, by motion-compensated prediction from a reference residual signal of the reference frame to obtain a residual prediction signal of the predetermined frame;
entropy encoding a final residual signal of the predetermined frame representing a difference between the predetermined frame and a sum of
the prediction signal of the predetermined frame; and
the residual prediction signal of the predetermined frame.

21. A non-transitory computer readable medium including a computer program comprising a program code for performing, when running on a computer, a hybrid video decoding method, comprising:
predicting a reference frame of a video by intra prediction or motion-compensated prediction to obtain a prediction signal of the reference frame;
predicting a residual signal of the reference frame, which relates to a prediction error of the prediction signal of the reference frame, by motion-compensated prediction from a reference residual signal of a further reference frame of the video to obtain a residual prediction signal of the reference frame;
entropy decoding a final residual signal of the reference frame; and
reconstructing the reference frame by summing
the prediction signal of the reference frame;
the residual prediction signal of the reference frame; and
the final residual signal of the reference frame;
predicting a predetermined frame of the video by intra prediction or motion-compensated prediction to obtain a prediction signal of the predetermined frame;
predicting a residual signal of the predetermined frame, which relates to a prediction error of the prediction signal of the predetermined frame, by motion-compensated prediction from a reference residual signal of the reference frame to obtain a residual prediction signal of the predetermined frame;
entropy decoding a final residual signal of the predetermined frame, and
reconstructing the predetermined frame by summing
the prediction signal of the predetermined frame;
the residual prediction signal of the predetermined frame; and
the final residual signal of the predetermined frame.

22. A non-transitory computer readable medium including a computer program comprising a program code for performing, when running on a computer, a hybrid video encoding method comprising:
predicting a reference frame of a video by intra prediction or motion-compensated prediction to obtain a prediction signal of the reference frame;
predicting a residual signal of the reference frame, which relates to a prediction error of the prediction signal of the reference frame, by motion-compensated prediction from a reference residual signal of a further reference frame of the video to obtain a residual prediction signal of the reference frame;
entropy encoding a final residual signal of the reference frame representing a difference between the reference frame and a sum of
the prediction signal of the reference frame; and
the residual prediction signal of the reference frame;
predicting a predetermined frame by intra prediction or motion-compensated prediction to obtain a prediction signal of the predetermined frame;
predicting a residual signal of the predetermined frame, which relates to a prediction error of the prediction signal of the predetermined frame, by motion-compensated prediction from a reference residual signal of the reference frame to obtain a residual prediction signal of the predetermined frame;
entropy encoding a final residual signal of the predetermined frame representing a difference between the predetermined frame and a sum of
the prediction signal of the predetermined frame;
the residual prediction signal of the predetermined frame.

23. Hybrid video encoding method according to claim 20, wherein the hybrid video encoding method further comprises:
selecting, for the predetermined frame, to
build the reference residual signal of the reference frame by the final residual signal of the reference frame, or
build the reference residual signal of the reference frame by a sum of the final residual signal of the reference frame and a residual prediction signal of the reference frame, and
selecting, for the reference frame, to
build the reference residual signal of the further reference frame by a final residual signal of the further reference frame, or
build the reference residual signal of the further reference frame by a sum of the final residual signal of the further reference frame and a residual prediction signal of the further reference frame, or
wherein the hybrid video encoding method further comprises
building a first candidate reference residual signal of the reference frame by the final residual signal of the reference frame and inserting the first candidate reference residual signal in a decoded picture buffer;
building a second candidate reference residual signal of the reference frame by a sum of the final residual signal of the reference frame and a residual prediction signal of the reference frame, and inserting the second candidate reference signal into the encoded picture buffer, and
selecting the first or second candidate reference residual signal as the reference residual signal of the reference frame with signalizing as to which of the first and second candidate reference residual signals is selected within a bitstream.

24. Hybrid video encoding method according to claim 20, further comprising building the reference residual signal of the reference frame by the final residual signal of the reference frame.

25. Hybrid video encoding method according to claim 20, further comprising building the reference residual signal of the reference frame by a sum of the final residual signal of the reference frame and the residual prediction signal of the reference frame.

26. Hybrid video encoder according to claim 18, further comprising building the reference residual signal of the reference frame by the final residual signal of the reference frame.

27. Hybrid video encoder according to claim 18, further comprising building the reference residual signal of the reference frame by a sum of the final residual signal of the reference frame and the residual prediction signal of the reference frame.

* * * * *